(12) United States Patent
Palangappa (10) Patent No.: US 10,372,620 B2
(45) Date of Patent: Aug. 6, 2019

(54) DEVICES, SYSTEMS, AND METHODS HAVING HIGH DATA DEDUPLICATION AND LOW READ LATENCIES

(71) Applicant: Intel Corporation, Santa Clara, CA (US)

(72) Inventor: Poovaiah M. Palangappa, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 15/395,259

(22) Filed: Dec. 30, 2016

(65) Prior Publication Data
US 2018/0188971 A1    Jul. 5, 2018

(51) Int. Cl.
*G06F 3/06* (2006.01)
*G06F 12/1018* (2016.01)

(52) U.S. Cl.
CPC ........ *G06F 12/1018* (2013.01); *G06F 3/0608* (2013.01); *G06F 3/0641* (2013.01); *G06F 3/0679* (2013.01); *G06F 3/0688* (2013.01); *G06F 2212/401* (2013.01)

(58) Field of Classification Search
CPC .................. G06F 3/0641; G06F 3/0644
See application file for complete search history.

(56) References Cited

U.S. PATENT DOCUMENTS

| | | | | |
|---|---|---|---|---|
| 2010/0042790 | A1* | 2/2010 | Mondal | G06F 3/0608 711/161 |
| 2010/0205163 | A1* | 8/2010 | Eshghi | G06F 11/1453 707/698 |
| 2011/0276781 | A1* | 11/2011 | Sengupta | G06F 12/0862 711/216 |
| 2012/0047324 | A1* | 2/2012 | Wideman | G06F 3/0608 711/111 |
| 2015/0193170 | A1* | 7/2015 | Sundaram | G06F 3/0641 711/103 |
| 2017/0293452 | A1* | 10/2017 | Hayasaka | G06F 12/00 |

* cited by examiner

*Primary Examiner* — Edward J Dudek, Jr.
*Assistant Examiner* — Andrew Russell
(74) *Attorney, Agent, or Firm* — Thorpe North & Western, LLP (57) ABSTRACT

Apparatuses, systems, and methods for deduplicating data using small data segments are described. Data strings are divided into a plurality of data segments having an original sequence order, and the data segments are rearranged according to an ordered sequence. The original sequence order of each data string is written to memory with a pointer to the ordered sequence of the data segments.

15 Claims, 6 Drawing Sheets

DEVICES, SYSTEMS, AND METHODS HAVING HIGH DATA DEDUPLICATION AND LOW READ LATENCIES

BACKGROUND

Computer systems operate by executing instruction sequences that form a computer program. These instruction sequences are stored in a memory subsystem along with any data operated on by the instructions, both of which are retrieved as necessary by a processor, such as a central processing unit (CPU). Memory subsystems have a limited capacity, which can be extended further through various hardware and software compression techniques. One type of compression technique is data deduplication, which includes various techniques for avoiding storing duplicate copies of the same data in the memory. In essence, one copy of a data string is stored in memory, and other copies of the same data string are written to memory as a pointer to the one copy of the data string. Thus, a read request for any of the matching data strings causes a copy of the stored data string to be read out to fill the request. Such a technique increases the capacity of the memory, reduces wear on the memory, and improves read and write latencies.

DESCRIPTION OF EMBODIMENTS

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "data request" refers to a communication from a host requesting that a data transaction be performed, such as a read or a write, for example. Thus, a "read request" is a data request for a read operation. Furthermore, the term "data transaction" refers to the implementation and performance of the data request in a memory controller and a memory, as well as the data address and Dynamic Random Access Memory (DRAM) commands used in such implementation. Thus, a "write transaction" is a data transaction of a write request.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

As the performance capabilities of computer systems advance, the storage data volume tends to increase, along with the data access-rates to that volume. These increases tend to stress the underlying memory, both in terms of capacity and endurance, which can cause memory capacity shortages and/or premature memory device failures. Various data deduplication (dedupe) schemes can be applied to data in a computer system in order to avoid storing duplicate copies of data in memory, or to remove duplicate copies of data from memory. Dedupe schemes generally divide a chunk (block) of data into multiple data segments that are stored in memory, to which other data chunks having those same segments (sub-block) are referenced. For writing data, a dedupe scheme ideally stores only one instance of any given data segment in memory, and stores pointers that refer to the data segment for any incoming write requests having the exact same data segment. For reading data, the read transaction may need multiple read accesses to reconstruct the requested data from the pointers that are mapped to the various separately stored data segments of the requested data. As such, an ideal dedupe scheme manages the memory with no duplicate data strings, and with little impact on write or read latencies.

The size of the data segment used to dedupe data (i.e., the dedupe granularity) has an impact on the dedupe ratio; a smaller data segment size can potentially decrease the dedupe ratio, but at the expense of requiring multiple read requests per chunk to the memory to read multiple sub-chunks of data, as opposed to a single chunk of data that was written to the memory. As one nonlimiting example using a traditional dedupe scheme, consider a data chunk of 24 symbols "AAAABBBBAAAACCCCAAAABBBB." If the data segment size used to dedupe the data stream is the size of the data requests, in this case 8 symbols, the data chunk is divided into "AAAABBBB"+"AAAACCCC"+"AAAABBBB," which requires only two unique 8-symbol data segments to be stored in the memory. Although such a scheme achieves a dedupe ratio of 2/3 (=0.67), the dedupe ratio can be improved by reducing the data segment size, say to 4 symbols. A dedupe with a 4-symbol data segment granularity divides the data stream into "AAAA"+

"BBBB"+"AAAA"+"CCCC"+"AAAA"+"BBBB," requiring the storage of only three 4-symbol segments in the memory, for a dedupe ratio of 3/6 (=0.5). Each traditional dedupe scheme has advantages and disadvantages. Traditional dedupe architectures using full-size data segments (i.e., the size of the data request) tend to have low read and write latencies; however, the dedupe ratio is high using full-size data segments. The dedupe ratio can be lowered using traditional dedupe architectures that utilize small-sized data segments; however, such a dedupe approach leads to a high read latency overhead. In general, a dedupe scheme that has split the data to be read into N chunks (segments), requires N disk reads for every read access. Because read accesses are always in the critical path, that translates into N×read latency overhead. In addition to the read latency overhead, a dedupe scheme using small-sized data segments (smaller than the size of the data request) increases the hash collision probability, or in other words, the probability that two different sequences of small-sized data segments can be hashed to generate the same hash value, because the loading factor of the hash potentially increases by N times.

The presently disclosed dedupe technology provides the dedupe ratio advantages of smaller dedupe segment sizes, without impacting the read-access latency. In one example, a data string (or other unit size of data) is divided into smaller segments that are rearranged according to a sequence pattern that can include any number of predetermined permutations, which lowers the dedupe ratio. In some cases, such rearrangement of the data segments can increase the likelihood that a given data string can be deduped by several orders of magnitude. Additionally, the present dedupe scheme preserves, if not extends, the collision resistance when used with traditional dedupe schemes, as it is agnostic to the underlying hash function.

$$\frac{N!}{\prod\limits_{i=1}^{K}(N_i!)} \approx \#sequences \qquad \text{EQ I}$$

Equation I (EQ I) provides the approximate number of sequence patterns for a given number of data segments, where N is the number of data segments, k is the number of unique data segments among the N data segments, and $N_i$ is the number of repetitions of $i^{th}$ unique data segment. The large number of potential sequence patterns increases the dedupe probability of the incoming data, and thus contributes to reducing the dedupe ratio.

Figure 1:
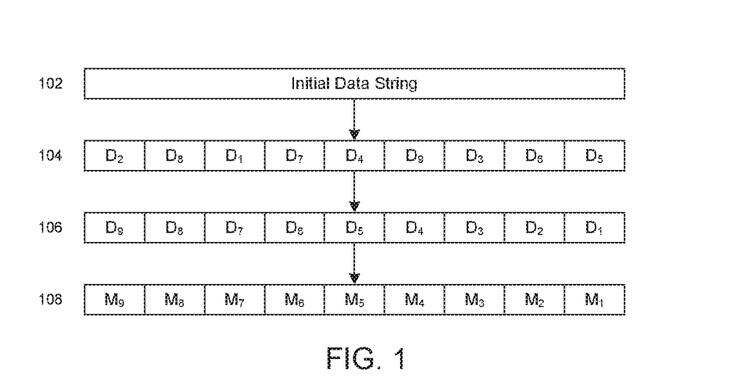
FIG. 1 illustrates the deduplication of a data string in accordance with an example embodiment.

A general example is shown in FIG. 1 that demonstrates the segmentation and rearrangement of a data string. An initial data string 102 is divided into multiple data segments 104, signified by $D_1$-$D_9$. The string of data segments 104 has an initial sequence of $D_2$, $D_8$, $D_1$, $D_7$, $D_4$, $D_9$, $D_3$, $D_6$, $D_5$, which needs to be preserved in order to recreate the original data string sequence from the data segments. The data segments 104 are rearranged according to a sequence pattern into a rearranged sequence 106. The term "rearranged sequence" is used herein to refer to the sequential arrangement of a plurality of data segments that have been rearranged from an original sequence to match a specific sequence pattern (i.e. a predetermined pattern). The rearranged sequence 106 can then be matched with an ordered sequence 108 in order to dedupe the rearranged sequence 106. As used herein, the term "ordered sequence" refers to a data construct comprised of a plurality of data segments arranged according to a predetermined pattern, where the ordered sequence is used as the data source for the data segments to which the deduped data is mapped. In other words, the ordered sequence includes the actual data of the data segments arranged in a specific order and stored in memory. Subsequent rearranged sequences rearranged according to the sequence pattern of the data segments of the ordered sequence are thus duplicates, and can be deduped by referencing to the ordered sequence.

The dividing or segmenting of data refers to separating a data string into smaller chunks or segments of data. In one example, the specifics of segmentation, including the size and/or structure of the resulting data segments, is established by the memory subsystem and deduplication architecture, and is not limiting. Various factors related to system architecture can influence the segmentation specifics, such as, for example, bandwidth, data sourcing applications, system availability, and the like, including combinations thereof. Segmentation specifics can readily be understood by those skilled in the art, once in possession of the present disclosure, because segmentation is dependent the various system parameters particular to a given system architecture.

The predetermined pattern can be any deterministic pattern, and is not considered to be limiting. For a pattern to be deterministic, the order of the data segments following rearrangement is the output of a known function. One example of such a function is sorting, where the data segments are sorted by some useful parameter, such as binary value, or any other parameter that allows the data segments to be sorted into a unique sequence.

Figure 2:
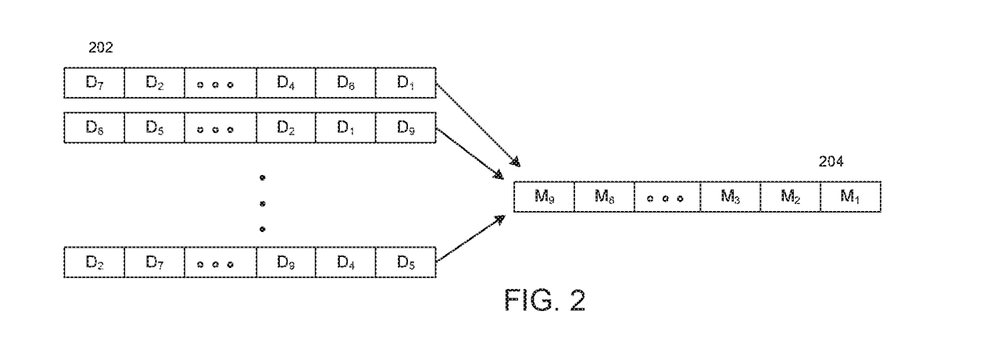
FIG. 2 illustrates the deduplication of multiple data string in accordance with an example embodiment.

FIG. 2 shows an example of multiple strings of data segments 202 having different sequences of the data segments, that are rearranged according to the sequence pattern of an ordered sequence 204. Once an initial ordered sequence has been established, incoming write requests for data strings that can be segmented and rearranged according to the established sequence pattern of a given ordered sequence can be stored as a pointer to the ordered sequence, along with the original sequence information of the data string. To fill the read request for the data string, a copy of the ordered sequence is retrieved from memory, and the data segments are rearranged according to the original sequence, which thus generates the data string for the read request.

Figure 3:
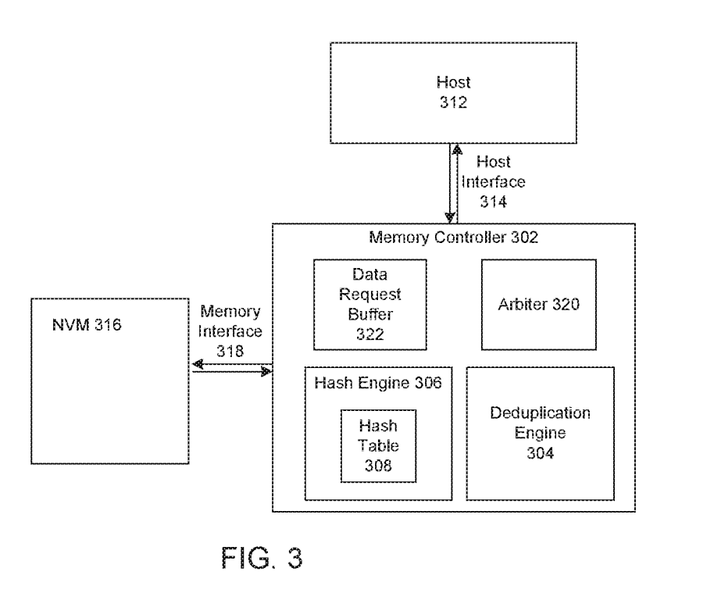
FIG. 3 is a block diagram of a memory controller in accordance with an example embodiment.

FIG. 3 shows a nonlimiting example comprising a memory controller 302 that includes a deduplication engine 304, a hash engine 306, and a hash table 308 in, or associated with, the hash engine 306. A host 312 is communicatively coupled to the memory controller 302 by a host interface 314, through which the host 312 sends data requests to, and receives data from, the memory controller 302. Additionally, the memory controller 302 is communicatively coupled to a non-volatile memory (NVM) 316 by a memory interface 318, through which the memory controller 302 performs data transactions with the NVM 316.

The host 312 can be one or more processors, one or more processor cores, an integrated controller, a memory controller, a Northbridge, a controller hub, a computing node, a system-on-a-chip (SoC), a server, a network, a laptop computer, a tablet computer, a desktop computer, a smart phone, various Input/Output (I/O) devices, or any other host capable of sending a data request to the memory controller for data that is capable of being deduped. In cases where the host input to the memory controller 302 comes from multiple host sources, or where multiple communications are coming from the same host source, an arbiter or arbitration interface 320 can be used to sort the data requests according to a given priority, in some cases according to various transaction and command scheduling policies. While the arbiter 320 is shown as part of the memory controller 302, the arbitration logic can be part of a system controller at the host, part of the memory controller, or at some point along the host interface therebetween. Arbitration allows incoming data requests to be buffered, both for multiple data requests incoming from the same host, and for multiple data requests incoming from different hosts. Regardless of the source, incoming data requests can be queued in a data request buffer 322. As such, the deduplication engine 304 can operate both on an incoming data stream or data request arriving at the memory controller 302, and on data strings that are queued in the data request buffer 322.

The host interface 110 can vary depending on the system architecture and the type/purpose of the NVM 316. In some examples, the host is a processor or processors communicating with the memory controller, either directly or through an integrated controller, and the host interface can be an internal bus. In other examples, the data deduplication is performed in a storage device that is coupled to the host through an external bus. The host interface can also include various network interfaces for both wired and wireless communication networks.

Figure 4:
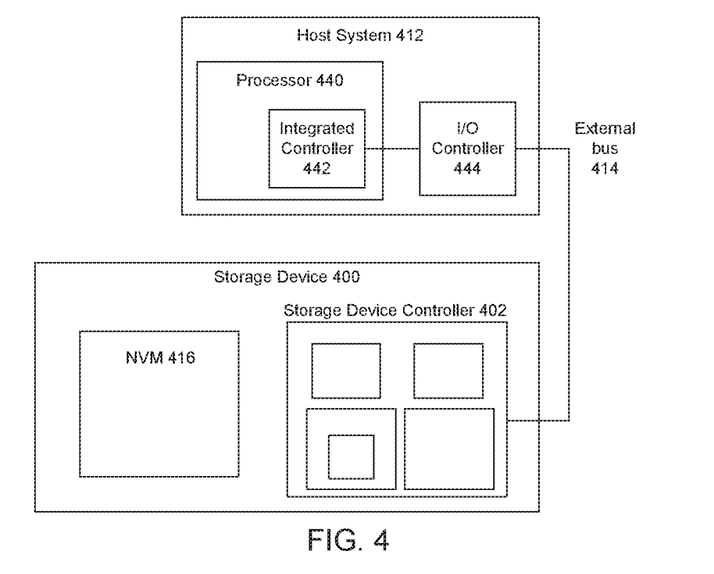
FIG. 4 is a block diagram of a host system and a storage device in accordance with an example embodiment.

FIG. 4 shows one example of a storage device 402 coupled to a host system 412 through an external bus 414. The storage device 402 includes a storage device controller 402 similar to the memory controller 302 described in FIG. 3, interfaced with a NVM 416 in which at least a portion of data is deduplicated. The host system 412 can be of any host configuration, and can comprise a processor or processors 440, with an integrated controller 442. The integrated controller controls data communications between the processor 440 and an I/O controller 444, which couples to the storage device controller 402 of the storage device 400 through the external bus 414. The storage device can be internal to the host system, externally couplable to the host system, or remotely couplable to the host system. Various nonlimiting examples of external bus host interfaces are contemplated, such as Peripheral Component Interconnect (PCI), PCI Express (PCIe), Serial Advanced Technology Attachment (SATA), Serial Attached Small computer system interface (SAS), NVM Express (NVMe), Remote Direct Memory Access (RDMA), Universal Serial Bus (USB), Small Computer System Interface (SCSI), Internet SCSI (iSCSI), Institute of Electrical and Electronics Engineers (IEEE) 1394 (Firewire), and the like.

NVM is not limited to any particular type of NVM, and any storage memory that can benefit from data deduplication is considered to be within the present scope. NVM in general is a storage medium that does not require power to maintain the state of data stored by the medium. Nonlimiting examples of NVM can include any or a combination of solid state memory (such as planar or three-dimensional (3D) NAND flash memory, NOR flash memory, or the like), cross point array memory, including 3D cross point memory, phase change memory (PCM), such as chalcogenide PCM, non-volatile dual in-line memory module (NVDIMM), byte addressable nonvolatile memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, spin transfer torque (STT) memory, nanowire memory, electrically erasable programmable read-only memory (EEPROM), magnetic storage memory, write in place non-volatile MRAM (NVMRAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Figure 5:
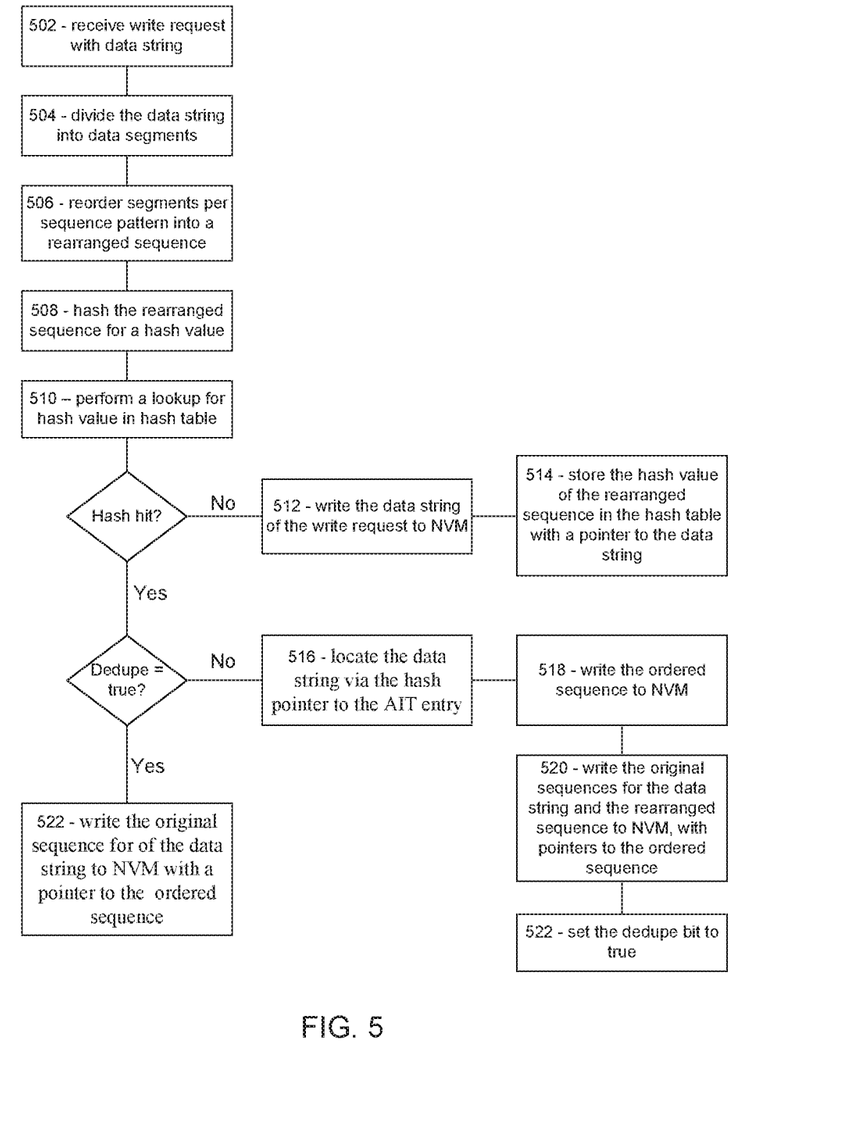
FIG. 5 is a flow diagram of a data deduplication scheme in accordance with an example embodiment.

FIG. 5 illustrates an example of a data dedupe flow described with reference to FIG. 3. For a write transaction, 502 a write request including a data string is received from the host 312 by the memory controller 302. The 504 data string is divided into a plurality of data segments, and 506 reordered according to a sequence pattern into a rearranged sequence by the deduplication engine 304. The rearranged sequence is then 508 hashed by the hash engine 306 to generate a hash value for the rearranged sequence, and 510 a hash lookup is performed on the hash table 308 for a hit on the hash value. The hash table 308 contains the various hash values for previously hashed rearranged sequence sequences, and a hit indicates that the sequence of data segments of the current rearranged sequence has been previously hashed, while a miss indicates that the sequence of data segments of the current rearranged sequence has not been previously hashed. As such, if the hash value lookup for the current rearranged sequence returns a miss, an ordered sequence corresponding to the sequence of the data segments of the rearranged sequence is not present in the memory system. In this case, 512 the data string associated with the write request is written to the NVM, and 514 the hash value of the rearranged sequence is written to the hash table 308 with a pointer to an entry in an address indirection table (AIT) referencing the location of the data string, as described more fully below. By including hash values for lookup misses in the hash table, the data segment sequence of the rearranged sequence from the data string stored in NVM can be used as an ordered sequence for future rearranged sequences having the same sequence, thus increasing the ordered sequence diversity of the hash table.

If, on the other hand, the hash value lookup returns a hit, the ordered sequence corresponding to the sequence of the rearranged sequence may or may not have been written to memory. For example, if the hash value was written to the hash table as the result of a hash lookup miss, then the associated data was written to the NVM as a data string, and the ordered sequence will not be present in memory. If, however, the hash value was written to the hash table as the result of a hash lookup hit, then the associated data was written to the NVM as an ordered sequence, and thus has been deduplicated. In order to differentiate between these two cases, a dedupe bit associated with the logical address of each data string can be used to indicate whether or not the associated data is deduplicated, or in other words, whether the stored data associated with the hash value is a data string or an ordered sequence.

As such, in response to the hash value hit, the memory controller checks the state of the dedupe bit associated with the data string. If the dedupe bit is set to false, the data string has not been deduplicated, and the data in the NVM associated with the hash value is stored as a data string (the "prior data string"). The memory controller 516 locates the prior data string through the pointer to the AIT entry, and 518 writes the ordered sequence of data segments corresponding to the hash value to the NVM, thus replacing the prior data string at the address referenced by the AIT entry. After dividing the prior data string into the plurality of data segments to generate the original sequence of the prior data string, the memory controller 520 writes the original sequences of the prior data string and the incoming rearranged sequence to the NVM, along with pointers to the ordered sequence. In this manner, the ordered sequence stores the data, and the original sequences store the information needed to reconstruct the data segments of the ordered sequence back into each of the data strings. The dedupe bit associated with each data string is then 522 set to true, to signify that the data strings have been deduplicated, and that the data associated with the hash value is an ordered sequence. Alternatively, if the memory controller checks the dedupe bit in response to the hash hit and the state is set to true, then 522 the memory controller writes the original sequence for the rearranged sequence to NVM with a pointer to the corresponding ordered sequence.

Figure 6:
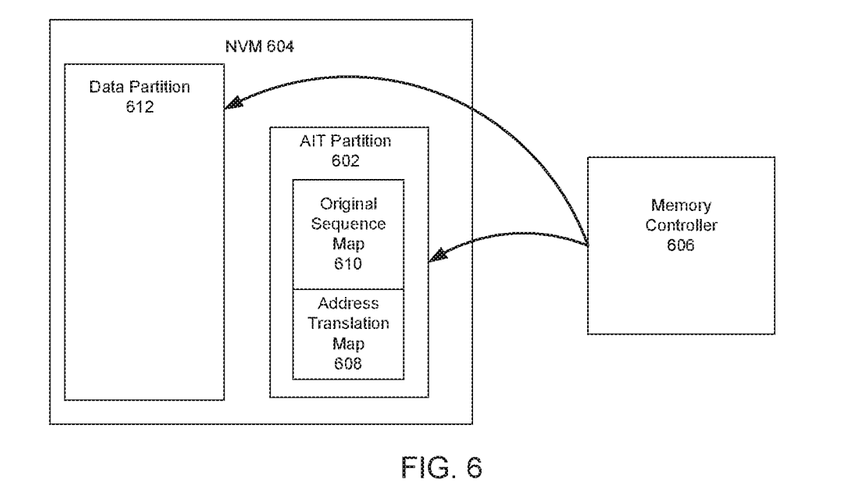
FIG. 6 is a block diagram of a memory controller and non-volatile memory (NVM) in accordance with an example embodiment.

As has been described, the hash value associated with an ordered sequence is stored in the hash table with the pointer to the location of the ordered sequence in NVM. FIG. 6 shows an example of an AIT partition 602 in NVM 604 communicatively coupled to the memory controller 606. An MT partition 602 maps, via an address translation map 608, logical addresses for data strings to the physical address of the associated ordered sequence in NVM. Whenever there is a dedupe hit, the physical address of the associated data is mapped to the logical addresses of the requests. However, in addition to the map of the physical address of the ordered sequence data to the set of deduped logical addresses (i.e. the deduped rearranged sequences), the original sequence arrangement of the data segments for each rearranged sequence needs to be saved in order to reconstruct the associated data strings. Saving the original sequence arrangement information may require, for example, an extra 64 bits of NVM space. In the example shown in FIG. 6, the original sequence arrangement information of the various rearranged sequences that have been reordered to match a given ordered sequence is stored in the AIT partition 602, in an original sequence map 610. The NVM 604 additionally comprises a data partition 612, in which the ordered sequence data is located. Although the original sequence information only needs to be stored for the set of deduped addresses, a dedupe bit needs to be stored and associated with the logical address of each or data string entry in the NVM to indicate the dedupe state. The dedupe bit thus increases the size of each MT entry by one bit.

With original sequence information and the dedupe bit located in the AIT partition 602, the memory controller 606 can access the ordered sequence data with two NVM access operations, indicated by the arrows in FIG. 6. In the first NVM access operation, the memory controller 606 finds and retrieves the dedupe bit and the original sequence for the requested data string from the original sequence map 610, and retrieves the physical address of the ordered sequence data from the address translation map 608, as referenced by the pointer. In the second NVM access operation, the memory controller 606 retrieves the ordered sequence data from the data partition 612 using the physical address retrieved from the first NVM access operation.

Figure 7:
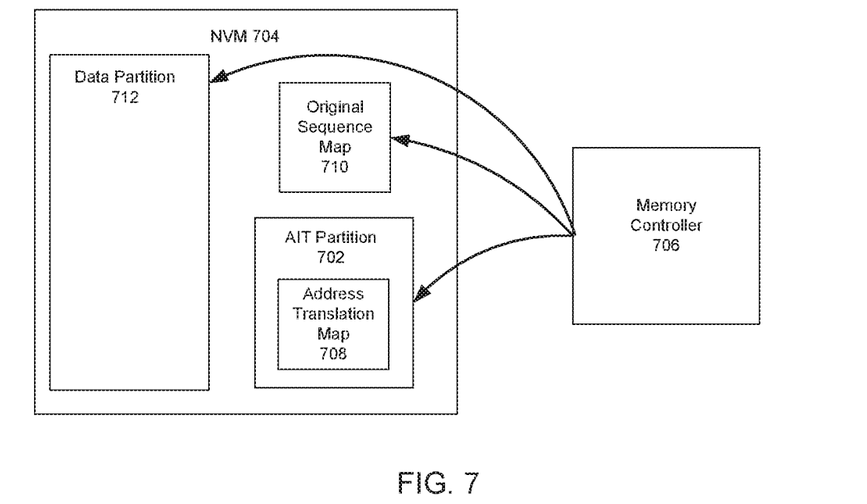
FIG. 7 is a block diagram of a memory controller and NVM in accordance with an example embodiment.

FIG. 7 shows an alternative example of a dedupe architecture, whereby an AIT partition 702 is located in NVM 704, and is communicatively coupled to a memory controller 706. The MT partition 702 comprises an address translation map 708 for mapping logical addresses requested by the memory controller 706 to the physical addresses in the NVM 704. The original sequence information is stored apart from the MT partition 702, in an original sequence map 710 along with a pointer to the ordered sequence data in a data partition 712 of the NVM 704.

With original sequence information and the dedupe bit located apart from the AIT partition 702, the memory controller 706 can access the ordered sequence data with three NVM access operations, indicated by the arrows in FIG. 7. In the first NVM access operation, the memory controller 706 performs a lookup of the address translation map 708, and retrieves the dedupe bit and a pointer to an entry in the original sequence map 710. In the second NVM access operation, the memory controller 706 retrieves the contents of the entry in the original sequence map 710 that was referenced by the pointer from the address translation map 708. The contents of the entry from the original sequence map 710 includes the original sequence for the rearranged sequence of the requested data string and a pointer to the physical address of the ordered sequence in the data partition 712. In the third NVM access operation, the memory controller 706 retrieves the ordered sequence data from the data partition 712 using the pointer retrieved and the second NVM access operation. The second approach introduces an extra NVM access operation compared to the approach shown in FIG. 6, but does not increase the size of the MT partition as a result of the original sequence information being stored in the NVM apart from the MT partition. As such, these two approaches represent a trade-off between MT partition size and latency.

Figure 8:
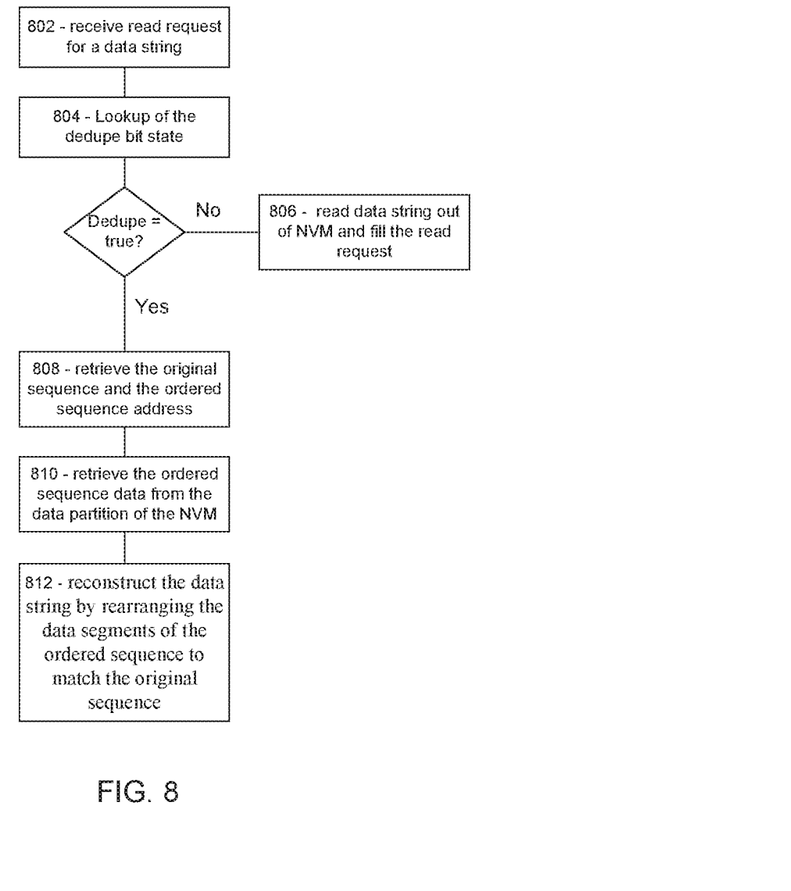
FIG. 8 is a flow diagram of a data reconstruction scheme in accordance with an example embodiment.

FIG. 8 illustrates one example of a read transaction flow for retrieving and reconstructing a requested data string from deduped data. A 802 read request for a logical address associated with a data string is received by the memory controller, which 804 performs a lookup of the state of the dedupe bit associated with the requested data. If the dedupe bit state is false, then 806 the data string is retrieved from the NVM by the memory controller and sent to the requesting host. If, however, the dedupe bit state is true, then the memory controller uses the pointer associated with the ordered sequence to 808 retrieve the original sequence data and the physical address of the ordered sequence. Depending on the storage location, retrieval of the original sequence data can include a NVM access to the AIT partition, as per the scheme shown in FIG. 6, or retrieval of the original sequence data can include a NVM access to the AIT partition and a NVM access to the original sequence map, as per the scheme shown in FIG. 7. 810 the ordered sequence data is then retrieved from the data partition of the NVM, and 812 reconstruct the data string by rearranging the data segments of the ordered sequence to match the original sequence.

Figure 9:
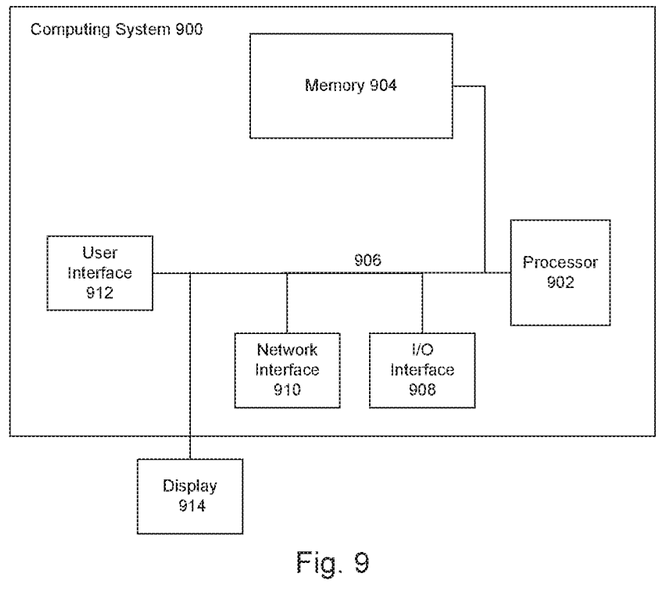
FIG. 9 is a block diagram of a general computing system in accordance with an example embodiment.

FIG. 9 illustrates an example of a general computing system or device 800 that can be employed using the present technology. While any type or configuration of device or computing system is contemplated to be within the present scope, non-limiting examples can include node computing systems, system-on-a-chip (SoC) systems, server systems, networking systems, high capacity computing systems, laptop computers, tablet computers, desktop computers, smart phones, and the like.

The computing system 900 can include one or more processors 902 in communication with a memory 904. The memory 904 can include any device, combination of devices, circuitry, or the like, that is capable of storing, accessing, organizing, and/or retrieving data. Additionally, a communication interface 906, such as a local communication interface, for example, provides connectivity between the various components of the system. For example, the communication interface 906 can be a local data bus and/or any related address or control busses as may be useful.

The computing system 900 can also include an I/O (input/output) interface 908 for controlling the I/O functions of the system, as well as for I/O connectivity to devices outside of the computing system 900. A network interface 910 can also be included for network connectivity. The network interface 910 can control network communications both within the system and outside of the system, and can include a wired interface, a wireless interface, a Bluetooth interface, optical interface, communication fabric, or the like, including appropriate combinations thereof. Furthermore, the computing system 900 can additionally include a user interface 912, a display device 914, as well as various other components that would be beneficial for such a system.

The processor 902 can be a single or multiple processors, including single or multiple processor cores, and the memory can be a single or multiple memories. The local communication interface can be used as a pathway to facilitate communication between any of a single processor or processor cores, multiple processors or processor cores, a single memory, multiple memories, the various interfaces, and the like, in any useful combination.

The memory 904 can include a memory with volatile memory, NVM, or a combination thereof. Volatile memory is a storage medium that requires power to maintain the state of data stored by the medium. Exemplary memory can include any combination of random access memory (RAM), such as static random access memory (SRAM), dynamic random access memory (DRAM), synchronous dynamic random access memory (SDRAM), and the like. In some examples, DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org).

Nonlimiting examples of NVM can include any or a combination of solid state memory (such as planar or three-dimensional (3D) NAND flash memory, NOR flash memory, or the like), cross point array memory, including 3D cross point memory, phase change memory (PCM), such as chalcogenide PCM, non-volatile dual in-line memory module (NVDIMM), byte addressable nonvolatile memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, spin transfer torque (STT) memory, nanowire memory, electrically erasable programmable read-only memory (EEPROM), magnetic storage memory, write in place non-volatile MRAM (NVM-RAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

EXAMPLES

The following examples pertain to specific embodiments and point out specific features, elements, or steps that can be used or otherwise combined in achieving such embodiments.

In one example, there is provided a memory controller device comprising a hash engine, a hash table, and circuitry configured to divide a received data string to be written to a memory into a plurality of data segments having an original sequence rearrange the plurality of data segments according to a predetermined pattern into a rearranged sequence, perform a hash operation on the rearranged sequence to generate a hash value, perform a lookup of the hash table for the hash value, and deduplicate the rearranged sequence if the hash value is in the hash table.

In one example of a device, the hash value is not in the hash table, and the circuitry is further configured to write the data string to a physical address in a nonvolatile memory (NVM), enter the hash value of the rearranged sequence into the hash table, enter a pointer to the physical address into the hash table, and associate the pointer with the hash value.

In one example of a device, the hash value is in the hash table, and the circuitry is further configured to retrieve a pointer associated with the hash value from the hash table, and check a state of a deduplication (dedupe) bit referenced by the pointer.

In one example of a device, the state of the dedupe bit is "true," and the circuitry, to deduplicate the rearranged sequence, is further configured to write the original sequence to a nonvolatile memory (NVM), and write an ordered sequence pointer with the original sequence in the NVM, where the ordered sequence pointer maps the original sequence to a physical address of an ordered sequence of data segments having the hash value of the rearranged sequence.

In one example of a device, the original sequence and the ordered sequence pointer are written to an address indirection table (AIT) partition of the NVM, and the pointer maps to the AIT partition.

In one example of a device, the original sequence and the ordered sequence pointer are written to an original sequence map in the NVM, and the pointer maps to an address indirection table (AIT) partition of the NVM, and the MT partition includes an original sequence pointer that maps to the original sequence map.

In one example of a device, the circuitry, upon receiving a read request for the data string from a host, is further configured to retrieve the original sequence and the ordered sequence pointer from the NVM, retrieve the ordered sequence of data segments from the NVM, and reconstruct the data string by rearranging the data segments of the ordered sequence to match the original sequence.

In one example of a device, the state of the dedupe bit is "false," and the circuitry, to deduplicate the rearranged sequence, is further configured to locate a physical address of a resident data string in a nonvolatile memory (NVM) corresponding to the hash value, divide the resident data string into the plurality of data segments having a resident data string original sequence, write the resident data string original sequence to the NVM, write a first ordered sequence pointer with the resident data string original sequence in the NVM, write the original sequence to the NVM, write a second ordered sequence pointer with the original sequence in the NVM, where the first and second ordered sequence pointers map to the physical address, and write the data segments of the rearranged sequence as an ordered sequence according to the predetermined pattern at the physical address.

In one example, there is provided a memory system, comprising a nonvolatile memory (NVM) including a data partition and an address indirection table (AIT) partition, a memory controller coupled to the NVM, and further comprising a hash engine, a hash table, and circuitry configured to divide a received data string to be written to a memory into a plurality of data segments having an original sequence, rearrange the plurality of data segments according to a predetermined pattern into a rearranged sequence, perform a hash operation on the rearranged sequence to generate a hash value, perform a lookup of the hash table for the hash value, and deduplicate the rearranged sequence if the hash value is in the hash table.

In one example of a system, the hash value is not in the hash table, and the circuitry is further configured to write the data string to a physical address in the NVM, enter the hash value of the rearranged sequence into the hash table, enter a pointer to the physical address into the hash table, and associate the pointer with the hash value.

In one example of a system, the hash value is in the hash table, and the circuitry is further configured to retrieve the pointer associated with the hash value from the hash table, and check a state of a deduplication (dedupe) bit, referenced by the pointer.

In one example of a system, the state of the dedupe bit is "true," and the circuitry, to deduplicate the rearranged sequence, is further configured to write the original sequence to the NVM, and write an ordered sequence pointer with the original sequence in the NVM, where the ordered sequence pointer maps the original sequence to a physical address of an ordered sequence of data segments having the hash value of the rearranged sequence.

In one example of a system, the original sequence and the ordered sequence pointer are written to the AIT partition of the NVM, and the pointer maps to the MT partition.

In one example of a system, the original sequence and the ordered sequence pointer are written to an original sequence map in the NVM, and the pointer maps to the AIT partition of the NVM, and the MT partition includes an original sequence pointer that maps to the original sequence map.

In one example of a system, the circuitry, upon receiving a read request for the data string from a host, is further configured to retrieve the original sequence and the ordered sequence pointer from the NVM, retrieve the ordered sequence of data segments from the NVM, and reconstruct the data string by rearranging the data segments of the ordered sequence to match the original sequence.

In one example of a system, the state of the dedupe bit is "false," and the circuitry, to deduplicate the rearranged sequence, is further configured to locate a physical address of a resident data string in the NVM corresponding to the hash value, divide the resident data string into the plurality of data segments having a resident data string original sequence, write the resident data string original sequence to the NVM, write a first ordered sequence pointer with the resident data string original sequence in the NVM, write the original sequence to the NVM, write a second ordered sequence pointer with the original sequence in the NVM, where the first and second ordered sequence pointers map to the physical address, and write the data segments of the rearranged sequence as an ordered sequence according to the predetermined pattern at the physical address.

In one example, a computer-implemented method is provided, comprising receiving, at a memory controller, a write request with a data string from a host, dividing, using a deduplication engine in the memory controller, the data string into a plurality of data segments having an original sequence, rearranging, using the deduplication engine in the memory controller, the plurality of data segments according to a predetermined pattern to generate a rearranged sequence, performing a hash operation, using a hash engine in the memory controller, the rearranged sequence to generate a hash value, performing a lookup of a hash table in the hash engine for the hash value, and deduplicating the rearranged sequence, using the deduplication engine, if the hash value was in the hash table.

In one example of a method, the hash value is not in the hash table, and the method further comprises writing, using the memory controller, the data string to a physical address in a nonvolatile memory (NVM), entering the hash value of the rearranged sequence into the hash table, entering a pointer to the physical address into the hash table, and associating the with the hash value.

In one example of a method, the hash value is in the hash table, and the method further comprises retrieving a pointer associated with the hash value from the hash table, and checking a state of a deduplication (dedupe) bit referenced by the pointer.

In one example of a method, the state of the dedupe bit is "true," and the method, to deduplicate the rearranged sequence, further comprises writing, using the memory controller, the original sequence to a nonvolatile memory (NVM), and writing, using the memory controller, an ordered sequence pointer with the original sequence in the NVM, where the ordered sequence pointer maps the original sequence to a physical address of an ordered sequence having the hash value of the rearranged sequence.

In one example of a method, the original sequence and the ordered sequence pointer are written to an address indirection table (AIT) partition of the NVM, and the pointer maps to the AIT partition.

In one example of a method, the original sequence and the ordered sequence pointer are written to an original sequence map in the NVM, and the pointer maps to an address indirection table (AIT) partition of the NVM, and the MT partition includes an original sequence pointer that maps to the original sequence map.

In one example of a method, upon receiving a read request for the data string from the host, further comprises retrieving, using the memory controller, the original sequence and the ordered sequence pointer from the NVM, retrieving, using the memory controller, the ordered sequence of data segments from the NVM, and reconstructing, using the memory controller, the data string by rearranging the data segments of the ordered sequence to match the original sequence.

In one example of a method, the state of the dedupe bit is "false," and the method, to deduplicate the rearranged sequence, further comprises locating, using the pointer, a physical address of a resident data string in a nonvolatile memory (NVM) corresponding to the hash value, dividing, using the deduplication engine, the resident data string into the plurality of data segments having a resident data string original sequence, writing, using the memory controller, the resident data string original sequence to the NVM, writing, using the memory controller, a first ordered sequence pointer with the resident data string original sequence in the NVM, writing, using the memory controller, the original sequence to the NVM, writing, using the memory controller, a second ordered sequence pointer with the original sequence in the NVM, where the first and second ordered sequence pointers map to the physical address, and writing, using the memory controller, the data segments of the rearranged sequence as an ordered sequence according to the predetermined pattern at the physical address.

The invention claimed is:

1. A memory controller device, comprising:
   a hash engine;
   a hash table; and
   circuitry configured to:
      divide a received data string to be written to a memory into a plurality of data segments having an original sequence;
      rearrange the plurality of data segments according to a predetermined pattern into a rearranged sequence;
      perform a hash operation on the rearranged sequence to generate a hash value;
      perform a lookup of the hash table for the hash value; and
      when the hash value is not in the hash table the circuitry is further configured to:
         write the data string to a physical address in a nonvolatile memory (NVM);
         enter the hash value of the rearranged sequence into the hash table;
         enter a pointer to the physical address into the hash table; and
         associate the pointer with the hash value; and
      when the hash value is in the hash table the circuity is further configured to:
         retrieve a pointer associated with the hash value from the hash table;
         check a state of a deduplication (dedupe) bit referenced by the pointer, wherein when the state of the dedupe bit is "true" the circuitry, to deduplicate the rearranged sequence, is further configured to:
            write the original sequence to a nonvolatile memory (NVM); and
            write an ordered sequence pointer with the original sequence in the NVM, where the ordered sequence pointer maps the original sequence to a physical address of an ordered sequence of data segments having the hash value of the rearranged sequence.

2. The device of claim 1, wherein the original sequence and the ordered sequence pointer are written to an address indirection table (AIT) partition of the NVM, and the pointer maps to the AIT partition.

3. The device of claim 1, wherein the original sequence and the ordered sequence pointer are written to an original sequence map in the NVM, and the pointer maps to an address indirection table (AIT) partition of the NVM, and the AIT partition includes an original sequence pointer that maps to the original sequence map.

4. The device of claim 1, wherein the circuitry, upon receiving a read request for the data string from a host, is further configured to:
   retrieve the original sequence and the ordered sequence pointer from the NVM;
   retrieve the ordered sequence of data segments from the NVM; and
   reconstruct the data string by rearranging the data segments of the ordered sequence to match the original sequence.

5. The device of claim 1, wherein when the state of the dedupe bit is "false" the circuitry, to deduplicate the rearranged sequence, is further configured to:
   locate a physical address of a resident data string in a nonvolatile memory (NVM) corresponding to the hash value;
   divide the resident data string into the plurality of data segments having a resident data string original sequence;
   write the resident data string original sequence to the NVM;
   write a first ordered sequence pointer with the resident data string original sequence in the NVM;
   write the original sequence to the NVM;
   write a second ordered sequence pointer with the original sequence in the NVM, where the first ordered sequence pointer and the second ordered sequence pointer map to the physical address; and
   write the data segments of the rearranged sequence as an ordered sequence according to the predetermined pattern at the physical address.

6. A memory system, comprising:
   a nonvolatile memory (NVM) including a data partition and an address indirection table (AIT) partition;
   a memory controller coupled to the NVM, and further comprising:
      a hash engine;
      a hash table; and
      circuitry configured to:
         divide a received data string to be written to the NVM into a plurality of data segments having an original sequence;
         rearrange the plurality of data segments according to a predetermined pattern into a rearranged sequence;
         perform a hash operation on the rearranged sequence to generate a hash value;
         perform a lookup of the hash table for the hash value; and
         when the hash value is not in the hash table the circuitry is further configured to:
            write the data string to a physical address in the NVM;
            enter the hash value of the rearranged sequence into the hash table;
            enter a pointer to the physical address into the hash table; and
            associate the pointer with the hash value; and
         when the hash value is in the hash table the circuitry is further configured to:
            retrieve a pointer associated with the hash value from the hash table;
            check a state of a deduplication (dedupe) bit referenced by the pointer, wherein when the state of the dedupe bit is "true" the circuitry, to deduplicate the rearranged sequence, is further configured to;
               write the original sequence to the NVM; and
               write and ordered sequence pointer with the original sequence in the NVM, where the ordered sequence pointer maps the original sequence to a physical address of an ordered sequence of data segments having the hash value of the rearranged sequence.

7. The system of claim 6, wherein the original sequence and the ordered sequence pointer are written to the AIT partition of the NVM, and the pointer maps to the AIT partition.

8. The system of claim 6, wherein the original sequence and the ordered sequence pointer are written to an original sequence map in the NVM, and the pointer maps to the AIT partition of the NVM, and the AIT partition includes an original sequence pointer that maps to the original sequence map.

9. The system of claim 6, wherein the circuitry, upon receiving a read request for the data string from a host, is further configured to:
retrieve the original sequence and the ordered sequence pointer from the NVM;
retrieve the ordered sequence of data segments from the NVM; and
reconstruct the data string by rearranging the data segments of the ordered sequence to match the original sequence.

10. The system of claim 6, wherein when the state of the dedupe bit is "false" the circuitry, to deduplicate the rearranged sequence, is further configured to:
locate a physical address of a resident data string in the NVM corresponding to the hash value;
divide the resident data string into the plurality of data segments having a resident data string original sequence;
write the resident data string original sequence to the NVM;
write a first ordered sequence pointer with the resident data string original sequence in the NVM;
write the original sequence to the NVM;
write a second ordered sequence pointer with the original sequence in the NVM, where the first ordered sequence pointer and the second ordered sequence pointer map to the physical address; and
write the data segments of the rearranged sequence as an ordered sequence according to the predetermined pattern at the physical address.

11. A computer-implemented method, comprising:
receiving, at a memory controller, a write request with a data string from a host;
dividing, using a deduplication engine in the memory controller, the data string into a plurality of data segments having an original sequence;
rearranging, using the deduplication engine in the memory controller, the plurality of data segments according to a predetermined pattern to generate a rearranged sequence;
performing a hash operation, using a hash engine in the memory controller, the rearranged sequence to generate a hash value;
performing a lookup of a hash table in the hash engine for the hash value; and
when the hash value is not in the hash table, and the method further comprises:
writing, using the memory controller, the data string to a physical address in a nonvolatile memory (NVM);
entering the hash value of the rearranged sequence into the hash table;
entering a pointer to the physical address into the hash table; and
associating the with the hash value; and
when the hash value is in the hash table, and the method further comprises:
retrieving a pointer associated with the hash value from the hash table;
checking a state of a deduplication (dedupe) bit referenced by the pointer, wherein when the state of the dedupe bit is "true" the method, to deduplicate the rearranged sequence, further comprises:
writing, using the memory controller, the original sequence to a nonvolatile memory (NVM); and
writing, using the memory controller, an ordered sequence pointer with the original sequence in the NVM, where the ordered sequence pointer maps the original sequence to a physical address of an ordered sequence having the hash value of the rearranged sequence.

12. The method of claim 11, wherein the original sequence and the ordered sequence pointer are written to an address indirection table (AIT) partition of the NVM, and the pointer maps to the AIT partition.

13. The method of claim 11, wherein the original sequence and the ordered sequence pointer are written to an original sequence map in the NVM, and the pointer maps to an address indirection table (AIT) partition of the NVM, and the AIT partition includes an original sequence pointer that maps to the original sequence map.

14. The method of claim 11, wherein, upon receiving a read request for the data string from the host, the method further comprises:
retrieving, using the memory controller, the original sequence and the ordered sequence pointer from the NVM;
retrieving, using the memory controller, the ordered sequence of data segments from the NVM; and
reconstructing, using the memory controller, the data string by rearranging the data segments of the ordered sequence to match the original sequence.

15. The method of claim 11, wherein when the state of the dedupe bit is "false" the method, to deduplicate the rearranged sequence, further comprises:
locating, using the pointer, a physical address of a resident data string in a nonvolatile memory (NVM) corresponding to the hash value;
dividing, using the deduplication engine, the resident data string into the plurality of data segments having a resident data string original sequence;
writing, using the memory controller, the resident data string original sequence to the NVM;
writing, using the memory controller, a first ordered sequence pointer with the resident data string original sequence in the NVM;
writing, using the memory controller, the original sequence to the NVM;
writing, using the memory controller, a second ordered sequence pointer with the original sequence in the NVM, where the first ordered sequence pointer and the second ordered sequence pointer map to the physical address; and
writing, using the memory controller, the data segments of the rearranged sequence as an ordered sequence according to the predetermined pattern at the physical address.

* * * * *